(12) United States Patent
Erickson

(10) Patent No.: US 9,648,860 B2
(45) Date of Patent: May 16, 2017

(54) LURE VIEWER

(71) Applicant: Don Erickson, Rosemount, MN (US)

(72) Inventor: Don Erickson, Rosemount, MN (US)

( * ) Notice: Subject to any disclaimer, the term of this patent is extended or adjusted under 35 U.S.C. 154(b) by 0 days.

(21) Appl. No.: 14/680,504

(22) Filed: Apr. 7, 2015

(65) Prior Publication Data

US 2016/0025282 A1  Jan. 28, 2016

Related U.S. Application Data

(60) Provisional application No. 61/976,058, filed on Apr. 7, 2014.

(51) Int. Cl.
*A01K 97/28* (2006.01)
*A01K 97/06* (2006.01)

(52) U.S. Cl.
CPC .............. *A01K 97/28* (2013.01); *A01K 97/06* (2013.01)

(58) Field of Classification Search
CPC ................................ A01K 97/28; A01K 97/06
USPC ................... 362/190, 191, 398, 396
See application file for complete search history.

(56) References Cited

U.S. PATENT DOCUMENTS

| | | | | |
|---|---|---|---|---|
| 5,179,797 A | * | 1/1993 | Edwards | A01K 97/125 |
| | | | | 362/191 |
| 5,566,493 A | | 10/1996 | Minorics | |
| 5,702,175 A | * | 12/1997 | Chen | F21V 21/32 |
| | | | | 362/184 |
| 6,546,665 B1 | | 4/2003 | Eldredge et al. | |
| RE38,897 E | * | 11/2005 | Krenzel | F16M 11/40 |
| | | | | 362/191 |
| 7,510,295 B2 | | 3/2009 | Shih | |
| 8,388,188 B2 | | 3/2013 | Propp | |
| 2003/0035285 A1 | * | 2/2003 | Huang | F21V 21/0885 |
| | | | | 362/191 |
| 2004/0090776 A1 | | 5/2004 | Yang | |
| 2008/0232097 A1 | * | 9/2008 | Gandhi | F21L 4/00 |
| | | | | 362/191 |
| 2008/0304257 A1 | * | 12/2008 | Opolka | F21S 9/02 |
| | | | | 362/191 |
| 2012/0002405 A1 | * | 1/2012 | Nelson | F21L 4/04 |
| | | | | 362/191 |

* cited by examiner

*Primary Examiner* — Laura Tso
(74) *Attorney, Agent, or Firm* — Global Intellectual Property Agency, LLC; Daniel Boudwin

(57) ABSTRACT

An apparatus for holding and viewing a fishing lure is provided. The apparatus includes a flexible, elongated rod having a first end and a second end. A light assembly is attached to the first end of the elongated rod. The light assembly includes a light source, a battery, and a switch, wherein the light source is electrically coupled to the battery through the switch. A fastener is attached to the second end of the elongated rod and is adapted to hold a fishing lure or bait. Alternatively, a magnet may be attached to the second end of the elongated rod. The elongated rod is a flexible wire adapted to wrap around a fishing rod, thereby providing visibility during low light and night time conditions.

6 Claims, 3 Drawing Sheets

LURE VIEWER

CROSS REFERENCE TO RELATED APPLICATION

This application claims the benefit of U.S. Provisional Application No. 61/976,058 filed on Apr. 7, 2014. The above identified patent application is herein incorporated by reference in its entirety to provide continuity of disclosure.

FIELD OF THE INVENTION

The present invention generally relates to an apparatus for providing light for fishing rod lures. More particularly, the present invention relates to an apparatus for viewing a fishing lure comprising an elongated rod having a first end and a second end, wherein a light assembly is attached to a first end and a fastener is attached to a second end of the elongated rod.

BACKGROUND OF THE INVENTION

Early morning and night fishing are popular for many reasons, including the fact that certain fish are most active in their feeding at night thereby making it more likely to catch certain fish at specific times during the day. However, fishing at these times presents several problems. Low light conditions are prevailing at these times of day, thus making it difficult to hold a fishing lure or a hook while baiting a fishing rod. Additionally, the poor lighting at night makes it difficult to see the fishing line. The line can thus become tangled at the reel or wrapped around the end of the rod because it is not seen.

Another problem associated with night fishing is the difficulty of performing certain tasks such as changing a hook or a lure, removing tangles from the line, netting a fish or the like. These tasks are often carried out while the fisherman holds a light in one hand and tries to complete the task with the other hand or by supporting a light nearby. However, the light used to carry out such tasks may, itself, create problems. For example, the light can be lost or forgotten, it may require special batteries or power sources, both of which may make the light expensive and difficult to use. Such lights can be left on, thus depleting the power source. Therefore, there is a need for a light which can both light a fishing rod and be used to carry out other activities associated with fishing in low light conditions.

Devices have been disclosed in the prior art that relate to flashlights on distal ends of a flexible rods. These include devices that have been patented and published in patent application publications. U.S. Published Patent Application Number 2004/0090776, U.S. Pat. No. 5,566,493, U.S. Pat. No. 8,388,188, and U.S. Pat. No. 7,510,295 generally relate to LED lights secured onto the end of a bendable wire. Further, U.S. Pat. No. 6,546,665 provides a fishing rod including a light source unit that is removably attached to the handle.

These prior art devices have several known drawbacks. Devices in the prior art generally relate to light sources coupled to fishing rods or the like. Such devices do not disclose a LED light on a distal end of an elongate bendable rod, whereby the LED is waterproof. Further, such devices fail to provide an elongate rod having a fastener or magnet disposed on the distal end opposite the LED adapted to removably secure the device to a fishing rod.

In light of the devices disclosed in the prior art, it is submitted that the present invention substantially diverges in design elements from the prior art and consequently it is clear that there is a need in the art for an improvement to existing lighting devices for fishing rods. In this regard the instant invention substantially fulfills these needs.

SUMMARY OF THE INVENTION

In view of the foregoing disadvantages inherent in the known types of lighting devices for fishing rods now present in the prior art, the present invention provides an elongated rod having a light on a distal end thereof wherein the same can be utilized for providing convenience for the user when baiting or hooking a lure in low light conditions.

It is therefore an object of the present invention to provide a new and improved apparatus for viewing a fishing lure that has all of the advantages of the prior art and none of the disadvantages.

It is another object of the present invention to provide an apparatus for viewing a fishing lure including an elongated rod having a first end and a second end, wherein the elongated rod is a flexible wire adapted to wrap around a fishing rod.

It is yet another object of the present invention to provide an apparatus for viewing a fishing lure including a light assembly attached to the first end of the elongated rod. The light assembly includes a LED, a battery, and a switch. The LED is electrically coupled to the battery through the switch. The switch can be depressed to complete a circuit between the LED and the battery.

It is still yet another object of the present invention to provide an apparatus for viewing a fishing lure including a fastener attached to the second end of the elongated rod. The fastener can be a spring-biased metal clip.

Another object of the present invention is to provide an apparatus for viewing a fishing lure including a magnet attached to the second end of the elongated rod. The elongated rod is a flexible wire adapted to wrap around a fishing rod and is further secured to the rod via the magnet.

A further object of the present invention is to provide an apparatus for viewing a fishing lure wherein the elongated rod is covered in a non-slip rubber material. The non-slip rubber material enables the device to be secured onto the length of a fishing pole by wrapping the elongated rod around the pole.

Another object of the present invention is to provide an apparatus for viewing a fishing lure that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
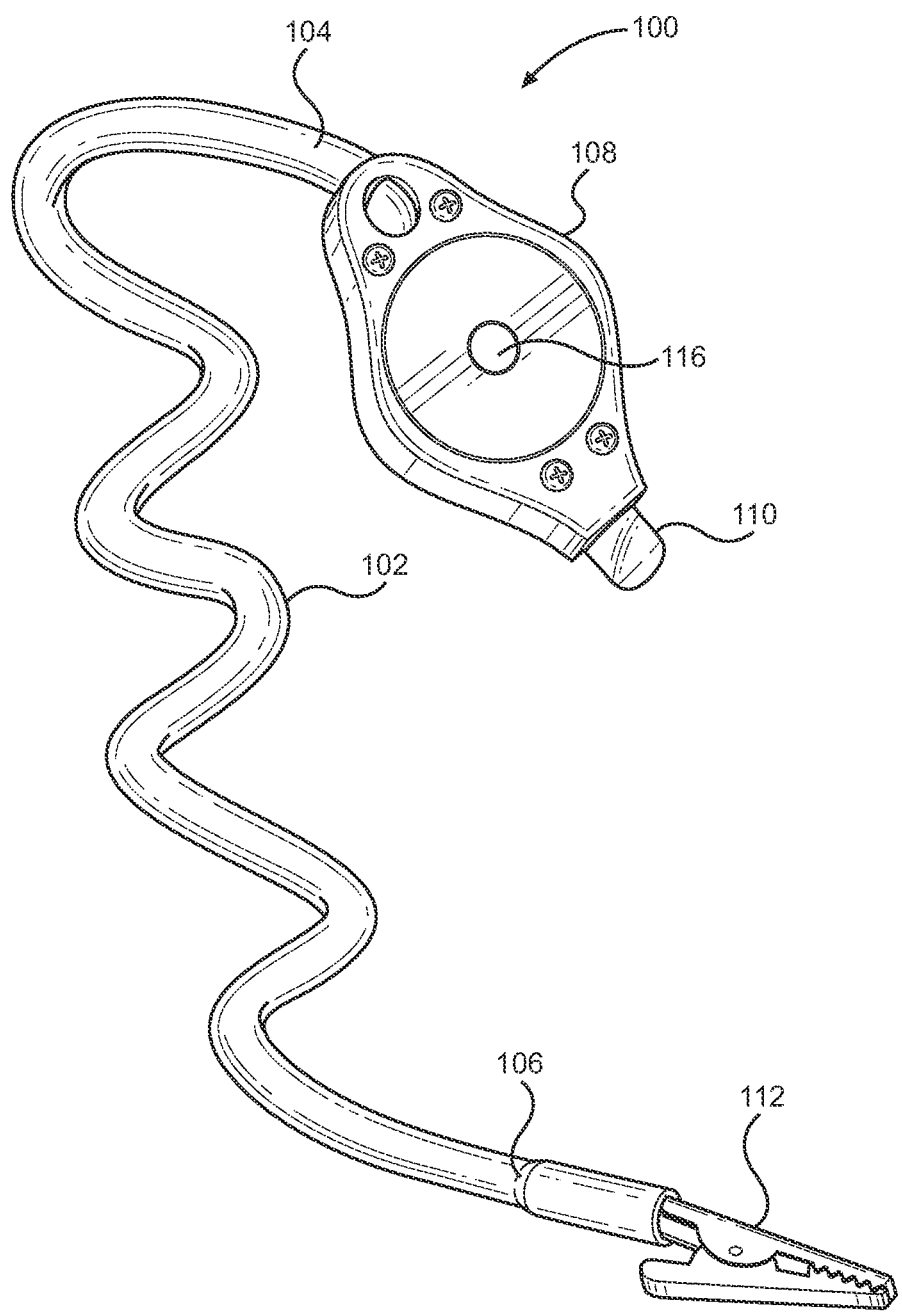
FIG. 1 shows a perspective view of the apparatus for viewing a fishing lure with a fastener according to one embodiment of the present invention.

Reference is made herein to the attached drawings. Like reference numerals are used throughout the drawings to depict like or similar elements of the apparatus for viewing a fishing lure. For the purposes of presenting a brief and clear description of the present invention, the preferred embodiment will be discussed as used for baiting a fishing lure. The figures are intended for representative purposes only and should not be considered to be limiting in any respect.

Figure 2:
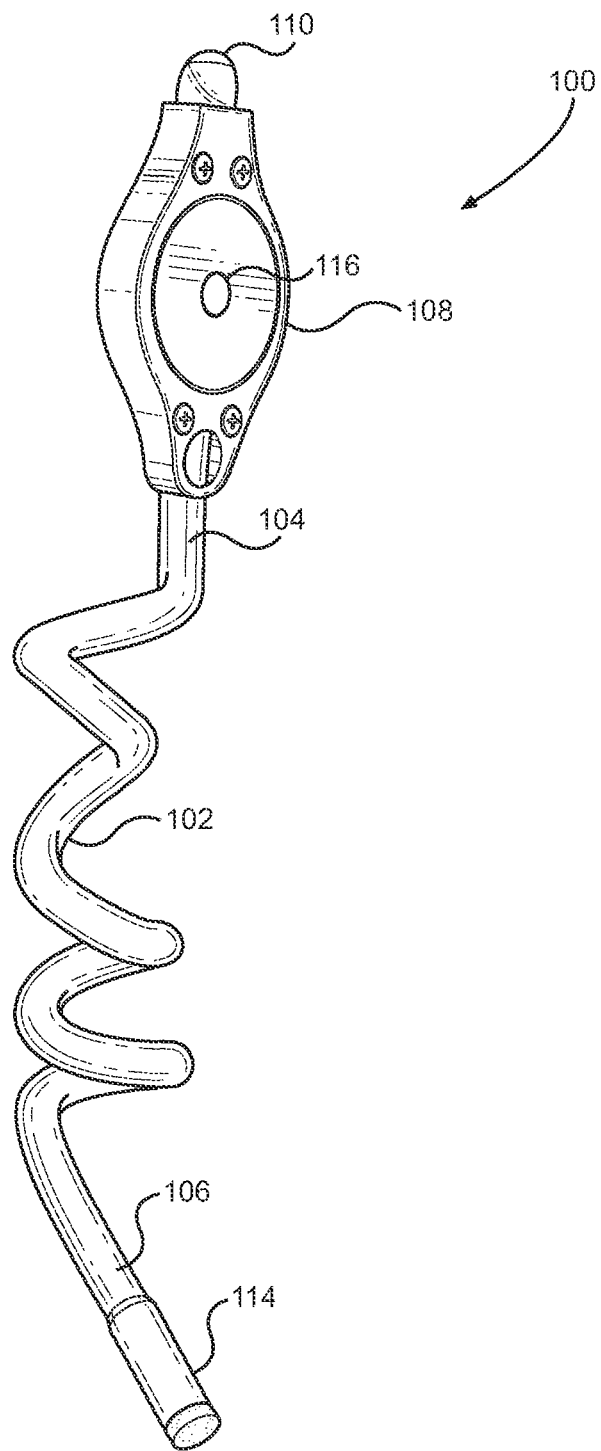
FIG. 2 shows a perspective view of the apparatus for viewing a fishing lure with a magnet according to one embodiment of the present invention.

Referring now to FIGS. 1 and 2, there are shown perspective views of the apparatus for viewing a fishing lure with a fastener and a magnet thereon, respectively. The apparatus 100 includes an elongated rod 102 having a first end 104 and a second end 106. The elongated rod 102 is a flexible wire adapted to wrap around a fishing rod or other object. The elongated rod 102 can be placed at any position along the fishing rod by twisting the wire around the shaft of the fishing rod. The flexible wire is covered in a non-slip rubber gripping material to form the elongated rod 102. The rubber gripping material encloses the flexible wire. The non-slip rubber gripping material prevents the assembly from shifting along the length of the fishing rod during use.

A light assembly 108 is attached to first end 104 of the elongated rod 102. The light assembly 108 comprises an oblong housing having substantially planar upper and lower surfaces. The oblong housing of the light assembly 108 includes a light source 110, a battery, and a switch 116. The light source 110 is disposed on the distal end of the elongated rod 102. In one embodiment, the light source 110 is an LED. The LED is electrically coupled to the battery via a metal contact. The switch 116 operably positions the metal contact in between the battery and the LED, completing the circuit. The switch 116 is selectively depressed to place the LED in electrical communication with the battery.

The elongated rod 102 further includes a fastener 112 attached to the second end 106 of the elongated rod 102. The fastener 112 is used to secure the device 100 to a portion of the shaft of the fishing rod so that the device 100 remains in place during use. The fastener 112 is preferably a spring-biased metal clip. The clip comprises two prongs extending therefrom having grooved teeth on opposing sides if the prongs. The grooves of each prong are adapted to receive the teeth of each prong in the cavities between the teeth. The clip is disposed on the second end 106 of the elongated rod 102.

In an alternate embodiment, the elongated rod 102 includes a magnet 114 attached to the second end 106 of the elongated rod 102. The magnet 114 is enclosed within the non-slip rubber coating material and extends to the distal end of the elongated rod 102. The elongated rod 102 wraps around the fishing rod and the magnet 114 secures the second end 106 to a metal contact on the fishing rod to prevent the apparatus 100 from shifting along the length of the fishing rod during use.

Figure 3:
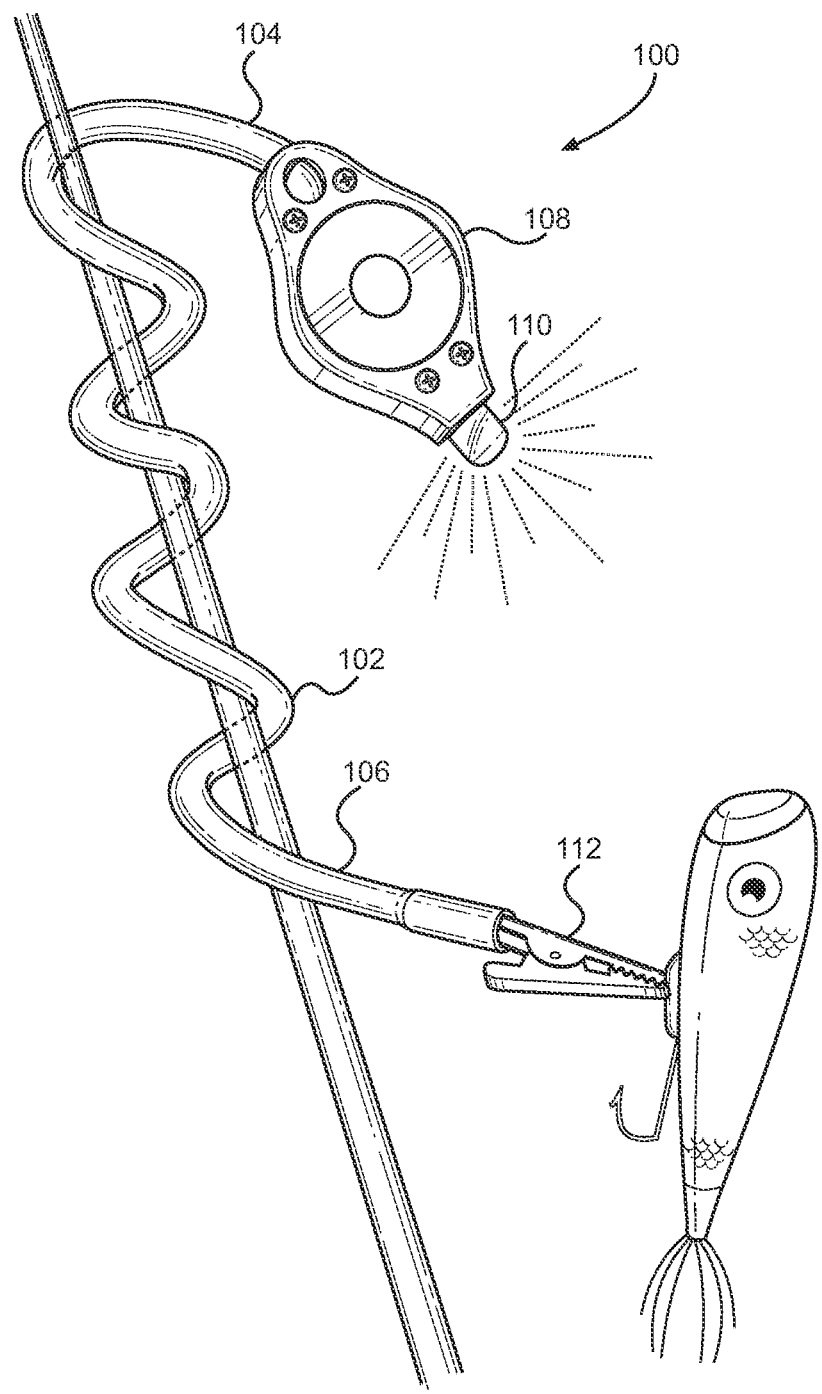
FIG. 3 shows the apparatus for viewing a fishing lure wrapped around a fishing pole according to one embodiment of the present invention.

Referring now to FIG. 3, there is shown the apparatus for viewing a fishing lure wrapped around a fishing pole according to one embodiment of the present invention. The elongated rod 102 is a flexible wire adapted to wrap around a fishing rod, thereby providing visibility during low light and night time conditions. A user can manipulate the elongated rod 102 to have the first end 104 on one portion of the fishing rod and a second end 106 on a second portion of the fishing rod. The apparatus 100 is preferably located on the lower end of the fishing rod such that the light source 110 on the light assembly 108 is directed to a fishing lure. The fastener 112 disposed on the second end 106 is adapted to securely hold bait or the lure. A user can selectively turn the light source 110 on and off to view the lure in low light conditions.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for viewing a fishing lure, comprising:
   an elongated rod having a first end and a second end, wherein the elongated rod is a flexible wire adapted to wrap around a fishing rod and maintain a helical shape;
   a non-slip rubber gripping material enclosing the flexible wire;
   a light assembly attached to the first end of the elongated rod, the light assembly including a LED, a battery, and a switch, wherein the LED is electrically coupled to the battery through the switch;
   a fastener attached to the second end of the elongated rod; and
   a fishing lure secured to the fastener.

2. The apparatus of claim 1, wherein the fastener comprises a clip.

3. The apparatus of claim 1, wherein the fastener is a spring biased clip.

4. The apparatus of claim 1, wherein the light assembly comprises an oblong housing having substantially planar upper and lower surfaces.

5. An apparatus for viewing a fishing lure, comprising:
   an elongated rod having a first end and a second end, wherein the elongated rod is a flexible wire adapted to wrap around a fishing rod and maintain a helical shape;
   a non-slip rubber gripping material enclosing the flexible wire;
   a light assembly attached to the first end of the elongated rod, the light assembly including a LED, a battery, and a switch, wherein the LED is electrically coupled to the battery through the switch; and
   a magnet attached to the second end of the elongated rod; and
   a fishing lure removably secured to the magnet.

6. The apparatus of claim 5, wherein the light assembly comprises an oblong housing having substantially planar upper and lower surfaces.

\* \* \* \* \*